United States Patent
Goel

(12) 
(10) Patent No.: US 8,873,814 B2
(45) Date of Patent: Oct. 28, 2014

(54) SYSTEM AND METHOD FOR USING FINGERPRINT SEQUENCES FOR SECURED IDENTITY VERIFICATION

(75) Inventor: Amit Goel, New Delhi (IN)

(73) Assignee: CA, Inc., Islandia, NY (US)

(*) Notice: Subject to any disclaimer, the term of this patent is extended or adjusted under 35 U.S.C. 154(b) by 300 days.

(21) Appl. No.: 13/299,851

(22) Filed: Nov. 18, 2011

(65) Prior Publication Data

US 2013/0129161 A1    May 23, 2013

(51) Int. Cl.
*G06K 9/00* (2006.01)
*G06F 21/32* (2013.01)

(52) U.S. Cl.
CPC ............ *G06F 21/32* (2013.01); *G06K 9/00355* (2013.01); *G06K 9/00087* (2013.01)
USPC ............ 382/124; 382/125; 382/103; 382/115

(58) Field of Classification Search
CPC ............ G06K 9/0002; G06K 9/00026; G06K 9/00013
USPC .................................................. 382/124, 125
See application file for complete search history.

(56) References Cited

U.S. PATENT DOCUMENTS

| | | | |
|---|---|---|---|
| 6,078,265 A | 6/2000 | Bonder et al. | |
| 6,757,410 B1 | 6/2004 | Nakashima | |
| 7,046,829 B2 | 5/2006 | Udupa et al. | |
| 7,382,904 B2 | 6/2008 | Lee | |
| 7,877,612 B2 * | 1/2011 | McKeeth | 713/186 |
| 2008/0223925 A1 * | 9/2008 | Saito et al. | 235/380 |
| 2009/0079540 A1 * | 3/2009 | Grafeev | 340/5.83 |

* cited by examiner

*Primary Examiner* — Ruiping Li
(74) *Attorney, Agent, or Firm* — Baker Botts, LLP

(57) ABSTRACT

According to one embodiment of the present disclosure, a method includes receiving session information including first fingerprint data corresponding to each of one or more fingers presented by an individual in a sequence on a sensor. The method also includes comparing the session information to stored information associated with the individual. The method further includes determining whether the identity of the individual is verified based on the session information and the sequence.

20 Claims, 1 Drawing Sheet

SYSTEM AND METHOD FOR USING FINGERPRINT SEQUENCES FOR SECURED IDENTITY VERIFICATION

TECHNICAL FIELD

The present disclosure relates generally to user identity verification, and more specifically to using fingerprint sequences for secured identity verification.

BACKGROUND

User identity verification and/or authentication is widely used in many different types of computing systems in order to control access to sensitive data and/or other information. Because of the high level of technology available to the public, however, hackers or other unauthorized users pose a greater threat to the security of computer systems. For example, losses due to identity theft in the United States top $30 billion per year.

Fingerprint scanning is one method available for identity verification, and may be used in computer security systems. It is generally accurate alone; however, it is not entirely foolproof as some fingerprint readers have been fooled by counterfeit fingerprint reproductions. For example, fingerprint scanners have been fooled in the past by xerographic copies of an individual's fingerprints or by fingerprints lifted from surfaces such as a desk.

SUMMARY

According to one embodiment of the present disclosure, a method includes receiving session information including first fingerprint data corresponding to each of one or more fingers presented by an individual in a sequence on a sensor. The method also includes comparing the session information to stored information associated with the individual. The method further includes determining whether the identity of the individual is verified based on the session information and the sequence.

In particular embodiments, the stored information comprises second fingerprint data and sequence data, and determining whether the identity of the individual is verified based on the session information and the sequence comprises: determining whether the first fingerprint data is substantially similar to the second fingerprint data, and determining whether the sequence matches the sequence data. In further embodiments, the second fingerprint data and the sequence data are pre-determined by the individual.

Particular embodiments of the present disclosure may allow for the session information to further comprise delay data indicating the amount of time between the presentation of each finger. Particular embodiments of the present disclosure may allow for the session information to further comprise duration data indicating the duration of time that each finger remains on the sensor. Particular embodiments of the present disclosure may allow for the session information to further comprise spatial data for each of the one or more fingers presented, the spatial data comprising start point data indicating where contact with the sensor began and end point data indicating where contact with the sensor ended. Particular embodiments of the present disclosure may allow for the session information to further comprise spatial data for each of the one or more fingers presented, the spatial data for each of the one or more fingers presented comprising line path data indicating the path which each respective finger took from where contact with the sensor began to where contact with the sensor ended. Particular embodiments of the present disclosure may allow for the session information to further comprise pressure data corresponding to each of the one or more fingers presented, the pressure data indicating the amount of pressure measured by the sensor. Particular embodiments of the present disclosure may allow for the session information further comprises moisture data corresponding to each of the one or more fingers presented, the moisture data indicating a measure of moisture measured by the sensor.

Technical advantages of particular embodiments of the present disclosure include leveraging the current fingerprint biometric hardware and software technologies, and adding various parameters or criteria to further secure the password and identity verification processes. Other technical advantages include the reduction of false positive identity verifications caused by counterfeit fingerprint reproductions. Other technical advantages include improved protection for critical resources and/or establishments.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Figure 1:
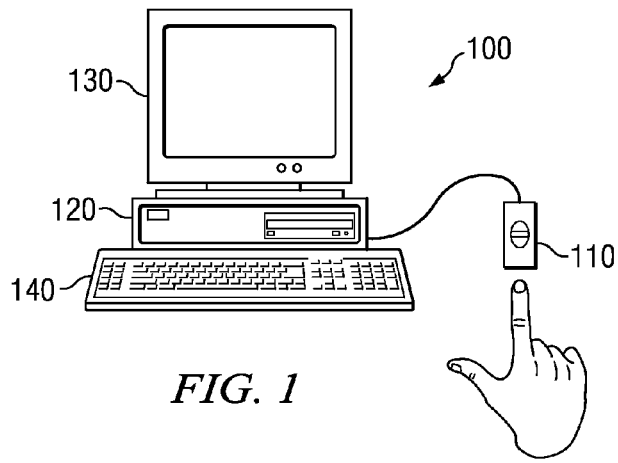
FIG. 1 illustrates a system using fingerprint sequences for secured password and identity verification.
Figure 2:
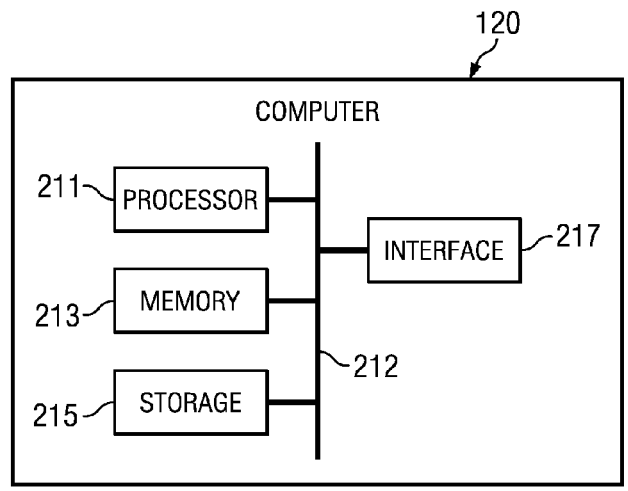
FIG. 2 illustrates a block diagram of a computer that may be used in accordance with particular embodiments.
Figure 3:
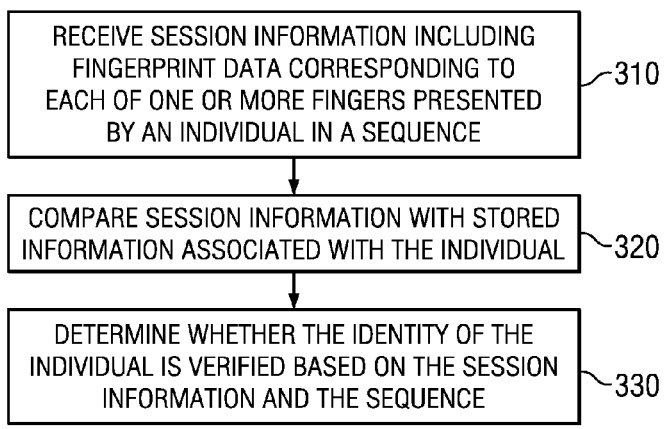
FIG. 3 illustrates an example method for identifying an individual using fingerprint sequences.

Embodiments of the present disclosure and its advantages are best understood by referring to FIGS. 1 through 3 of the drawings, like numerals being used for like and corresponding parts of the various drawings.

FIG. 1 illustrates a system 100 that includes a computer 120, fingerprint scanner 110, and display 130, and may embody aspects of the present disclosure. In particular embodiments, system 100 may provide secured password and/or identity verification using fingerprint sequences. Existing fingerprint identification systems merely allow for an individual to present a single finger to a fingerprint scanner for verification. Single fingerprint scanning alone is generally accurate; however, it is not foolproof. For instance, some fingerprint scanners have been fooled by latex fingers molded to represent a genuine fingerprint. Other fingerprint scanners have been fooled by fingerprints that were lifted from surfaces with laser printer toner and then reproduced on a photocopier.

According to the present disclosure, however, an individual may present her fingers to fingerprint scanner 110 in system 100 in a sequence in order to verify her identity. Such a system may be used, for example, in computer logins or secured building access points. The sequence may be chosen by the individual herself, just as the individual would choose her own password for a computer or website. For example, the individual may choose the following sequence for future identity verification: index, middle, ring, pinky. The sequence may be used in lieu of, or in addition to, a text-based password system. For example, a user may insert text in between certain finger presentations within a sequence. In addition, two or more fingers may be presented at the same time within the sequence. For example, a user may choose the following sequence for identity verification: index, middle, middle/ring/pinky (where middle/ring/pinky represents the three fingers being presented on the scanner simultaneously). Furthermore, certain requirements may be placed on an individual's sequence. For instance, system 100 may require that a sequence be longer than a certain number of fingers presented, and/or may require that a certain amount of different fingers be presented. As another example, system 100 may require that a sequence contain both text and finger presentation in the sequence.

In particular embodiments, system 100 may scan each finger as it is presented to fingerprint scanner 110. In such embodiments, system 100 may record which finger is presented and at which point in the sequence it is presented. For example, the individual may present her fingers in the following order: index, middle, ring, pinky. In this example, system 100 may read each fingerprint via fingerprint scanner 110 and recognize that the index finger was presented first, the middle finger second, the ring finger third, and the pinky finger fourth. It will be appreciated that the same finger may be presented twice in the same sequence, and that the fingers presented may be from either of the individual's hands. In further embodiments, system 100 may then determine whether the individual's identity is verified based on the fingerprints and the sequence in which the fingers were presented to fingerprint scanner 110. Such determination may be made by comparison to a stored sequence chosen by a particular individual.

Other criteria may be used for identity verification in addition to the sequence criterion, which may serve to strengthen the identity verification process. For example, the time delay between each finger presentation may be used to verify an individual's identity. Such time delays may vary between each finger being presented. Further, every individual may have a unique style or rhythm of using their fingers for certain tasks. For instance, while typing a certain word, an individual will use her fingers to type the word in the same fashion with a certain delay between each keystroke, which may be on the order of milliseconds. The individual typing that word may have a unique delay between each keystroke as compared to another individual typing the same word. At least one embodiment of the present disclosure may exploit this behavior in order to verify the identity of individuals. In such embodiments, the individual may set a sequence that is as simple as typing a certain sentence. The sentence may then be saved as a sequence of fingerprints with varied delays rather than as a text-based password. Similarly, the duration of time that each finger remains pressed on the fingerprint scanner may be used in order to verify an individual's identity.

In addition, in some embodiments, the shapes, pictures, or symbols one makes on the fingerprint scanner may be used to verify an individual's identity. For example, an individual may set a password comprising certain letters or symbols drawn on the fingerprint scanner. In such embodiments, the fingerprint scanner may be operable to recognize a start point, an end point, and a line path for each finger presented. Similar to the time delay criterion above, an individual's unique start point, end point, and/or line path may also be exploited for verifying the individual. Furthermore, the fingerprint scanner may be operable to measure the duration of each finger stroke, and may exploit this information for verifying an individual's identity. Other criterion measured by the fingerprint scanner and used in the verification process may include an amount of pressure exerted by each finger presented and/or an amount of moisture on each finger presented. Any other suitable criteria for verifying an individual's identity may be used, either alone or in conjunction with any of the above. Moreover, in some embodiments, a certain tolerance, margin of error, or delta may be used in conjunction with each criterion in order to avoid false negative identity verifications.

Fingerprint scanner 110 may refer to any suitable device operable to read and/or recognize fingerprint patterns. Fingerprint scanner 110 may include, for example, a surface and/or sensor operable to capture a digital image of a fingerprint pattern. The captured digital image may be digitally processed to create fingerprint data which is stored and used for matching. The fingerprint data may include a collection of extracted features of the digital image of the fingerprint pattern. In some embodiments, the fingerprint data may include data representing the entire fingerprint pattern of an individual. In other embodiments, fingerprint data may include data representing only partial fingerprint patterns of an individual. For example, fingerprint data may include data representing only the top half or upper left quadrant of a particular fingerprint pattern. Fingerprint scanner 110 may use sensor technologies including optical, ultrasonic, passive capacitance, active capacitance, or any other suitable sensor technology.

Output device 130 may refer to any suitable device operable for displaying information to a user. Output device 130 may include, for example, a video display, a printer, a plotter, or other suitable output device. Input device 140 may refer to any suitable device operable to input, select, and/or manipulate various data and information. Input device 140 may include, for example, a keyboard, mouse, graphics tablet, joystick, light pen, microphone, scanner, or other suitable input device.

FIG. 2 illustrates a block diagram of a computer that may be used in accordance with particular embodiments. Computer 120 may be a component of, or coupled to, an endpoint used by a user (e.g., a smart phone, tablet, notebook, desktop computer, etc.) or one or more backend components used to verify an individual's identity using fingerprint sequences, or any other feature disclosed herein. In particular embodiments, one or more of these computer systems may perform one or more steps of one or more methods. In particular embodiments, one or more computer systems may provide functionality described or illustrated herein. In particular embodiments, encoded software running on one or more computer systems may perform one or more steps of one or more methods or provide functionality described or illustrated herein.

The components of computer 120 may comprise any suitable physical form, configuration, number, type and/or layout. As an example, and not by way of limitation, computer 120 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer 120 may include one or more computer systems; be unitary or distributed; span multiple locations; span multiple machines; or reside in a cloud, which may include one or more cloud components in one or more networks.

Where appropriate, computer 120 may perform without substantial spatial or temporal limitation one or more steps of one or more methods. As an example, and not by way of limitation, computer 120 may perform in real time or in batch mode one or more steps of one or more methods. One or more computers may perform at different times or at different locations one or more steps of one or more methods, where appropriate.

In the depicted embodiment, computer 120 may include its own respective processor 211, memory 213, storage 215, interface 217, and bus 212. These components may work together to provide one or more features associated with identity verification using fingerprint sequences. Although a particular computer is depicted having a particular number of particular components in a particular arrangement, this disclosure contemplates any suitable computer having any suitable number of any suitable components in any suitable arrangement. It is not necessary for each computer used within a platform to have the same components, or the same type of components. In some embodiments, two or more computers may be coupled to one another through one or more networks, such as the Internet or a LAN.

Processor 211 may be a microprocessor, controller, application specific integrated circuit (ASIC), or any other suitable computing device, resource, or combination of hardware, software and/or encoded logic operable to provide, either alone or in conjunction with other components, (e.g., memory 213) one or more features and/or functionality associated with identity verification using fingerprint sequences. One such feature may include determining whether the identity of an individual is verified based on certain information received. Another such feature may include determining whether first fingerprint data is substantially similar to second fingerprint data, and determining whether first sequence data is substantially similar to second sequence data. Additional functionality may include providing various features discussed further herein.

In particular embodiments, processor 211 may include hardware for executing instructions, such as those making up a computer program. As an example and not by way of limitation, to execute instructions, processor 211 may retrieve (or fetch) instructions from an internal register, an internal cache, memory 213 or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215 and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate. Memory 213 may store any suitable data or information utilized by computer 120, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. In particular embodiments, one or more memory management units (MMUs) may reside between processor 211 and memory 213 and facilitate accesses to memory 213 requested by processor 211.

As an example and not by way of limitation, computer 120 may load instructions from storage 215 or another source (such as, for example, another computer system, another platform, or another device coupled to computer 120) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

In particular embodiments, storage 215 may include mass storage for data or instructions. As an example and not by way of limitation, storage 215 may include a hard disk drive (HDD), a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to computer 120 (and/or remote transceiver 220), where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include hardware, encoded software, or both providing one or more interfaces for communication (such as, for example, packet-based communication) between computer 120, front cards, rear cards, bridge cards, any networks, any network devices, and/or any other computer systems. As an example, and not by way of limitation, interface 217 may include a network interface controller (NIC) or network adapter for communicating with an Ethernet or other wire-based network and/or a wireless NIC (WNIC) or wireless adapter for communicating with a wireless network. Interface 217 may include one or more connectors for communicating traffic (e.g., IP packets) via a bridge card.

Depending on the embodiment, interface 217 may be any type of interface suitable for any type of network in which computer 120 is used. As an example and not by way of limitation, computer 120 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Computer 120 may include any suitable interface 217 for any one or more of these networks, where appropriate.

In some embodiments, interface 217 may include one or more interfaces for one or more I/O devices. One or more of these I/O devices may enable communication between a person and computer 120. For example, such I/O devices may include fingerprint scanner 110, output device 130, and input device 140 as shown in FIG. 1. An I/O device may also include, for example, a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 217 for them. Where appropriate, interface 217 may include one or more drivers enabling processor 211 to drive one or more of these I/O devices. Interface 217 may include one or more interfaces 217 where appropriate.

Bus 212 may include any combination of hardware, software embedded in a computer readable medium, and/or encoded logic incorporated in hardware or otherwise stored (e.g., firmware) to couple components of computer 120 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

While various implementations and features are discussed with respect to multiple embodiments, it should be understood that such implementations and features may be combined in various embodiments. For example, features and functionality discussed with respect to a particular embodiment may be used in connection with features and functionality discussed with respect to another such embodiment, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within computer 120 such as a processor, memory, storage, an interface, and a bus, these elements may be combined, rearranged or positioned in order to accommodate particular switching, routing, or platform needs. In addition, any of these elements may be provided as separate external components to computer 120 or each other where appropriate. Particular embodiments contemplate great flexibility in the arrangement of these elements as well as their internal components.

FIG. 3 illustrates an example method for identifying an individual using fingerprint sequences. The method begins at step 310, where system 100 receives session information including first fingerprint data corresponding to each of one or more fingers presented by an individual in a sequence on a sensor. For example, an individual may present her fingers in the following order: index, middle, ring, pinky. The sequence may be of any length, and the individual may present any number of fingers from either hand in the sequence. Furthermore, the sequence may include the same finger or fingers presented more than once. For example, the sequence may have a length of 10, yet the individual may only present 2 unique fingers (e.g. index, middle, index, middle, index). Likewise, the sequence may have a length of 5, with the individual presenting 5 unique fingers on different hands (e.g. index of right hand, middle of right hand, index of left hand, middle of left hand, thumb of right hand). In certain embodiments, the sequence may be pre-determined by the individual. For example, the individual may choose the sequence much like one would choose a password for a computer login.

System 100 may determine the length of the sequence by counting the amount of finger presentations during a fixed amount of time. For example, a "timeout" of 10 seconds may be used. In this example, a user may have 10 seconds to enter their individual sequence for identity verification. System 100 may also determine the length of the sequence by counting the amount of finger presentations between a first finger presentation and when the individual has struck a certain key on input device 140. The first finger presentation may be determined as being the first after a timeout, or the first since the last input from input device 140. For example, an individual may be required to strike an "Enter" key on input device 140 in order to finish the sequence much in the same way an individual must strike the "Enter" key in order to submit their password.

In particular embodiments, the sensor may be operable to capture fingerprint data identifying each of the one or more fingers presented. For example, some embodiments may capture a digital image of a fingerprint pattern for each finger presented. The captured digital image may be digitally processed to create fingerprint data which is stored and used for matching. The fingerprint data may include a collection of extracted features of the digital image of the fingerprint pattern. The fingerprint data may represent any portion of the fingerprint pattern presented. The sensor may utilize technologies including optical, ultrasonic, passive capacitance, active capacitance, or any other suitable fingerprint sensing technology.

In particular embodiments, the sensor may be operable to capture delay data comprising the amount of time between the presentation of each finger. The amount of time between presentation may be of any length of time. Capturing the amount of time between the presentation of each finger may act to add another level of security to the identity verification process. For example, when presenting her fingers in a sequence, an individual may instinctively or unconsciously include a certain amount of time delay between each finger being presented. As another example, an individual may present her fingers in such a way that mimics the rhythm of a certain song, drum beat, or piano tune. Doing so will introduce predictable time delays between each finger being presented. Certain embodiments may exploit these time delays in order to add another layer of security to the identity verification process. Similarly, in some embodiments, the sensor may be operable to capture duration data comprising the duration of time that each finger remains on the sensor. Such embodiments may exploit an individual's idiosyncrasies in the duration of time that each finger remains on the sensor much like those that would exploit the time delay between each finger being presented. In addition, the amount of time between each finger presented may be deliberate by the individual. For example, much like Morse code, the individual may choose to have short or long delays between each finger presented in the sequence.

In some embodiments, the sensor may be operable to capture spatial data for each of the one or more fingers presented, the spatial data comprising start point data and end point data. For example, an individual may present her fingers in a sequence, with each finger starting at a start point on the sensor and ending at an end point on the sensor. In such embodiments, the sensor may be operable to recognize and/or track the start point and end point of each finger. In some embodiments, the sensor may be operable to capture line path data for each of the one or more fingers presented. For example, a user may present her fingers by drawing certain letters or other shapes with each finger being presented. In such embodiments, the sensor may be operable to track the path that each finger takes while on the sensor.

In some embodiments, the sensor may be operable to capture pressure data for each of the one or more fingers presented, the pressure data comprising the amount of pressure placed on the sensor. For example, when presenting her fingers in a sequence, an individual may instinctively or unconsciously present each finger on the sensor with a certain amount of pressure. Certain embodiments may exploit this in order to add another layer of security to the identity verification process. In some embodiments, an average pressure exerted with each finger may be measured. For example, system 100 may request that the individual enter their fingerprint sequence multiple times in order to determine the average pressure exerted by each finger in the sequence. In other embodiments, the pressure may be deliberately chosen by the individual. For example, the user may choose to apply relatively light pressure for the first, third, and fifth fingers presented, and apply relatively heavy pressure for the second and fourth fingers presented in a five finger sequence.

In some embodiments, the sensor may be operable to capture moisture data for each of the one or more fingers presented, the moisture data comprising a measure of moisture on the fingers. For example, an individual may tend to have a certain amount of moisture (e.g. sweat and/or oil) on her fingers. Certain embodiments may exploit this in order to add another layer of security to the identity verification process. Similar to the average pressure measurement process described above, system 100 may determine an average moisture on an individual's fingers and use this information to later verify the identity of the individual. In such embodiments, an imposter may be determined by an increased or decreased amount of moisture on the fingers relative to the average.

In particular embodiments, the session information may comprise first fingerprint data identifying each of the one or more fingers presented. For example, if an individual presented her fingers in the sequence of index, middle, ring, pinky, the first fingerprint data will comprise data for each of the index, middle, ring, and pinky fingers, and the data for each finger will include certain data identifying that finger. In certain embodiments, the data identifying each finger may include a digital image of the fingerprint pattern for the finger. In certain embodiments, the data identifying each finger may include data that is sampled from a digital image of the fingerprint pattern for the finger.

In some embodiments the session information may comprise first sequence data comprising the sequence in which the one or more fingers are presented. For example, if the individual presented her fingers in the following order: index, middle, ring, pinky, the session information may include data indicating that the index finger was presented first, the middle finger second, the ring finger third, and the pinky finger fourth. In further embodiments, the sequence data for each finger may be stored in conjunction with other data for the finger. In some embodiments, this may include storing, for example, the fingerprint data for a finger and the sequence data for the same finger in the same row of a data table. For instance, in the above example where the individual has presented her fingers in the order index, middle, ring, pinky, a first row in a data table may include fingerprint data for the index finger and the number 1 (representing that the index finger was first in the sequence). Likewise, another row in the data table may include fingerprint data for the middle finger and the number 2.

In some embodiments, the session information may include delay data comprising the amount of time between the presentation of each finger. For example, if the individual presented her fingers in the following order: index, middle, ring, pinky, the session information may include data indicating that the delay between the index and middle finger presentations. Likewise, the session information may include data indicating the delay between the middle and ring finger presentations, and/or the delay between the ring and pinky finger presentations. In further embodiments, the delay data may be stored in conjunction with other data for either finger in the delay sequence. In the above example, this would mean the delay data between the index and middle finger may be stored in conjunction with either the index or middle finger. In certain embodiments, the session information may be stored in a data table format. For instance, referring the above example, a first row in a data table may include fingerprint data for the index finger and delay data for the index-middle presentations.

In some embodiments, the session information may include duration data comprising the duration of time that each finger remains on the sensor. For example, if the individual presented her index finger on the sensor for 10 ms, the session information may include data indicating that amount of time. In further embodiments, the duration data for each finger may be stored in conjunction with other data for the finger. In some embodiments, this may include storing, for example, the fingerprint data for a finger and the duration data for the same finger in the same row of a data table. For instance, in the example where the individual has presented her fingers in the order index, middle, ring, pinky, a first row in a data table may include fingerprint data for the index finger and a number representing the amount of time that the index finger was placed on the sensor.

In some embodiments, the session information may include spatial data for each of the one or more fingers presented, the spatial data comprising start point data and end point data. For example, an individual may present her fingers in a sequence, with each finger starting at a start point on the sensor and ending at an end point on the sensor. The start point data may include data that indicates the location at which a finger was first presented on the sensor. Likewise, the end point data may include data that indicates the location at which a finger was removed from the sensor. In some embodiments, the session information may include spatial data for each of the one or more fingers presented, the spatial data comprising line path data. For example, a user may present her fingers by drawing certain letters or other shapes with each finger being presented. Thus, the line path data may include data that indicates a path that a finger takes on the sensor.

In some embodiments, the session information may include pressure data for each of the one or more fingers presented, the pressure data comprising the amount of pressure placed on the sensor. For example, if the individual presented her index finger with 2 psi, the session information may include data indicating that amount of pressure. Likewise, if the individual presented her middle finger with 1 psi, the session information may include data indicating that amount of pressure. In further embodiments, the pressure data for each finger may be stored in conjunction with other data for the finger. In some embodiments, this may include storing, for example, the fingerprint data for a finger and the pressure data for the same finger in the same row of a data table. For instance, in the example where the individual has presented her fingers in the order index, middle, ring, pinky, a first row in a data table may include fingerprint data for the index finger and a number representing the amount of pressure that the index finger placed on the sensor. In other embodiments, varying levels of pressure within each finger presentation may be recorded. For example, an individual may present her index finger on the scanner for 10 seconds, during which time she places 2 psi of pressure on the scanner for 2 seconds, 3 psi for the next 3 seconds, and 5 psi for the next 5 seconds.

In some embodiments, the session information may include moisture data for each of the one or more fingers presented, the moisture data comprising a measure of moisture on the fingers. For example, the session information may include data indicating the amount of moisture on each finger. In some embodiments, this may include storing, for example, the fingerprint data for a finger and the moisture data for the same finger in the same row of a data table. For instance, in the example where the individual has presented her fingers in the order index, middle, ring, pinky, a first row in a data table may include fingerprint data for the index finger and a number representing the amount of moisture on the index finger.

At step 320, system 100 compares the session information to stored information associated with the individual. In particular embodiments, the stored information may include second fingerprint data and sequence data. In some embodiments, comparing the session information to stored information may include comparing digital images in the first fingerprint data to digital images in the second fingerprint data. In certain embodiments, the second fingerprint data and the sequence data may be pre-determined by the individual. For example, in some embodiments, the second fingerprint data may comprise images of the individual's fingerprint patterns. As another example, in some embodiments, the second fingerprint data may comprise data that is sampled from digital images of the fingerprint patterns of the individual.

At step 330, system 100 determines whether the identity of the individual is verified based on the session information and the sequence. In particular embodiments, determining whether the identity of the individual is verified based on the session information may include determining whether the first fingerprint data is substantially similar to second fingerprint data in stored information, and determining whether the sequence matches sequence data in the stored information. Determining whether the first fingerprint data is substantially similar to the second fingerprint data may refer to comparing and/or matching the first data and second data using a certain tolerance, margin of error, or delta. Including a margin of error or tolerance in the determining step may serve to reduce the amount of false negative verifications that may occur due to distortions of a fingerprint pattern when placed on the sensor. For example, a margin of error may be determined from a statistical confidence level analysis. In such example, system 100 may determine that the individual's identity is verified even without a perfect data match between the first and second data, as long as the first data is within a certain margin of error of the second data.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed:

1. A method, comprising:
   receiving session information including first fingerprint data corresponding to each of one or more fingers presented by an individual in a sequence on a sensor, and duration data indicating a respective duration of time that each remains on the sensor;
   comparing the session information to stored information associated with the individual; and
   determining whether the identity of the individual is verified based on the session information and the sequence.

2. The method of claim 1, wherein the stored information comprises second finger print data and sequence data, and wherein determining whether the identity of the individual is verified based on the session information and the sequence comprises:
   determining whether the first fingerprint data is substantially similar to the second fingerprint data; and
   determining whether the sequence matches the sequence data.

3. The method of claim 2, wherein the second fingerprint data and the sequence data are pre-determined by the individual.

4. The method of claim 1, wherein the session information further comprises delay data indicating the amount of time between the presentation of each finger.

5. The method of claim 1, wherein the session information further comprises spatial data for each of the one or more fingers presented, the spatial data comprising start point data indicating where contact with the sensor began and end point data indicating where contact with the sensor ended.

6. The method of claim 1, wherein the session information further comprises spatial data for each of the one or more fingers presented, the spatial data for each of the one or more fingers presented comprising line path data indicating the path which each respective finger took from where contact with the sensor began to where contact with the sensor ended.

7. The method of claim 1, wherein the session information further comprises pressure data corresponding to each of the one or more fingers presented, the pressure data indicating the amount of pressure measured by the sensor.

8. The method of claim 1, wherein the session information further comprises moisture data corresponding to each of the one or more fingers presented, the moisture data indicating a measure of moisture measured by the sensor.

9. A system comprising one or more processors operable to:
   receive session information including first fingerprint data corresponding to each of one or more fingers presented by an individual in a sequence on a sensor, and duration data indicating a respective duration of time that each finger remains on the sensor;
   compare the session information to stored information associated with the individual; and
   determine whether the identity of the individual is verified based on the session information and the sequence.

10. The system of claim 9, wherein the session information further comprises delay data indicating the amount of time between the presentation of each finger.

11. The system of claim 9, wherein the session information further comprises spatial data for each of the one or more fingers presented, the spatial data comprising start point data indicating where contact with the sensor began and end point data indicating where contact with the sensor ended.

12. The system of claim 9, wherein the session information further comprises spatial data for each of the one or more fingers presented, the spatial data for each of the one or more fingers presented comprising line path data indicating the path which each respective finger took from where contact with the sensor began to where contact with the sensor ended.

13. The system of claim 9, wherein the session information further comprises pressure data for each of the one or more fingers presented, the pressure data indicating the amount of pressure placed on the sensor.

14. The system of claim 9, wherein the session information further comprises moisture data for each of the one or more fingers presented, the moisture data indicating a measure of moisture on the fingers.

15. Logic encoded in non-transitory computer-readable storage medium, the logic comprising instructions that when executed by a processor are operable to:
   receive session information including first fingerprint data corresponding to each of one or more fingers presented by an individual in a sequence on a sensor, and duration data indicating a respective duration of time that each finger remains on the sensor;
   compare the session information to stored information associated with the individual; and
   determine whether the identity of the individual is verified based on the session information and the sequence.

16. The logic of claim 15, wherein the session information further comprises delay data indicating the amount of time between the presentation of each finger.

17. The logic of claim 15, wherein the session information further comprises spatial data for each of the one or more fingers presented, the spatial data comprising start point data indicating where contact with the sensor began and end point, data indicating where contact with the sensor ended.

18. The logic of claim 15, wherein the session information further comprises spatial data for each of the one or more fingers presented, the spatial data for each of the one or more fingers presented comprising line path data indicating the path which each respective finger took from where contact with the sensor began to where contact with the sensor ended.

19. The logic of claim 15, wherein the session information further comprises pressure data for each of the one or more fingers presented, the pressure data indicating the amount of pressure placed on the sensor.

20. The logic of claim 15, wherein the session information further comprises moisture data for each of the one or more fingers presented, the moisture data indicating a measure of moisture on the fingers.

* * * * *